Patented Oct. 10, 1939

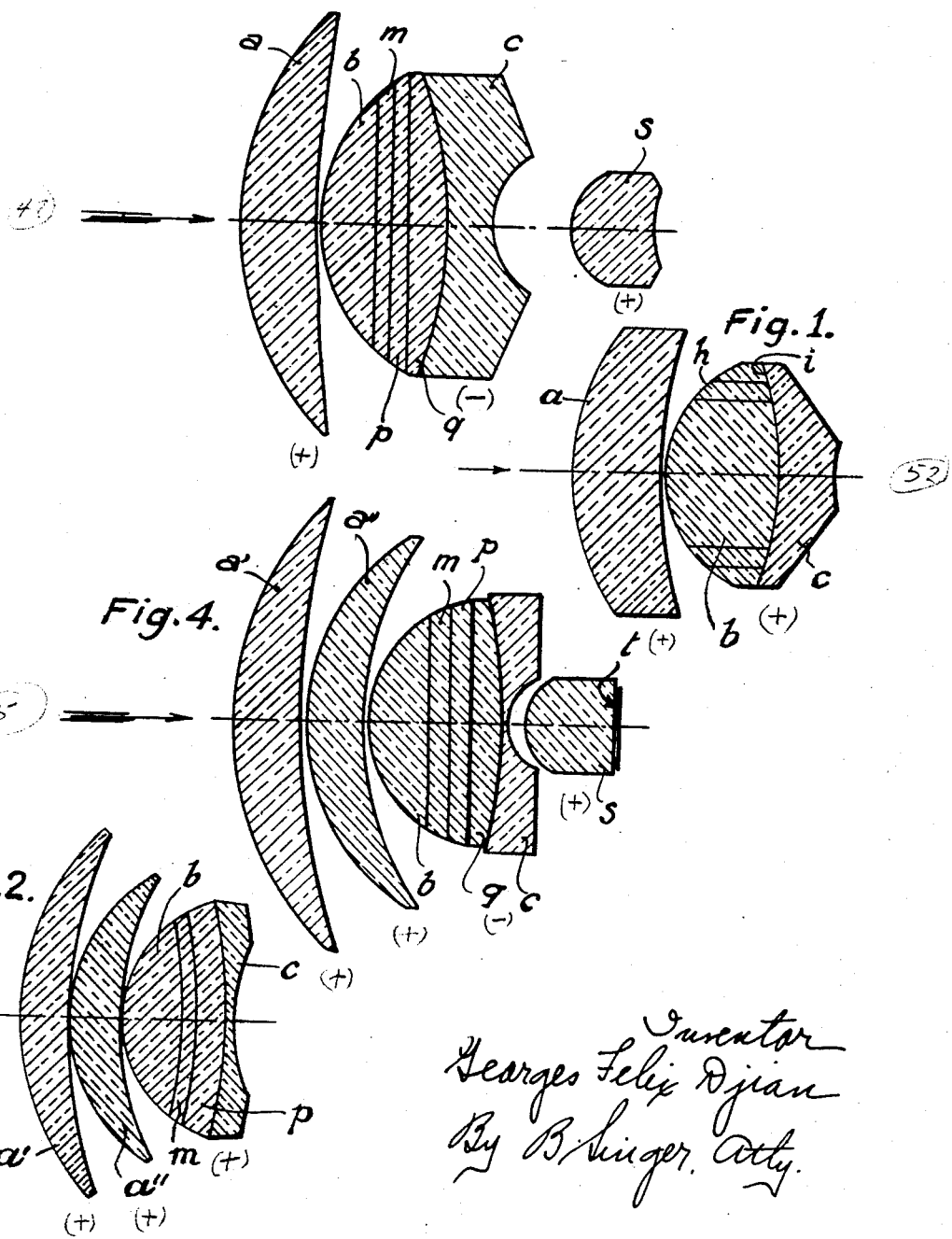

2,175,518

UNITED STATES PATENT OFFICE 2,175,518

PHOTOGRAPHIC OBJECTIVE OF HIGH LUMINOSITY

Georges Félix Djian, Paris, France

Application February 5, 1937, Serial No. 124,324
In France February 13, 1936

6 Claims. (Cl. 88—57)

The largest relative apertures heretofore attained in photographic objectives were still not sufficient for the taking of cinematographic views, such, e. g., in the cinematography of fluorescent radioscopic screens, Braun ampoules or in telecinematography.

The invention has for its object to provide a photographic objective having a relative aperture which is essentially larger than f:1.

In certain special cases, more particularly in the cinematography of a radioscopic screen, it is not necessary to make the objective achromatic because the luminous spectrum of this screen cannot be considered as being practically monochromatic.

The objective according to this invention comprises:

On the side of the object, a first element formed either by a simple or composite converging lens, or else by two converging meniscus lenses;

To the rear of this first element a second element is provided having a thickness equal to at least 40% of the focal distance of the objective, and comprising a converging front lens and a diverging rear lens, the refractive index of the latter exceeding by at least 0.15 that of the front lens.

According to the invention, the front face of the second element has a central portion of spherical form surrounded by a peripherical portion of aspherical form the curvature of which is the greater as the distance to the optical axis is greater.

The curvatures of these aspherical borders are determined in such manner that the focal distance and the drawing shall be identical for the central and the peripherical portion of the whole objective.

This aspherical shape of the front and external edge of the second element permits of correcting zone effects in a satisfactory manner.

In a preferred embodiment this characteristic feature of the invention is obtained by disposing about a central lens a series of concentric rings having a same index of refraction and aspherical front surfaces with curvatures growing in a continuous manner as the distance to the optical axis increases. By giving a suitable thickness to these rings the spherical aberration will be corrected and the sinusoidal requirements complied with.

The same result may also be obtained by the arrangement of a series of segments of lenses between the aforesaid central lens and the rear portion of the second element, the borders of said segments of lenses extending beyond the central lens and having aspherically shaped front surfaces the curvature of which grows with the distance to the optical axis.

Besides the two elements described hereabove the objective according to the invention may comprise a third element, such as a simple or composite converging lens, the focal distance of which is shorter than that of the first element.

Whenever the rearmost surface is plane a liquid is preferably interposed between the rear face of the third element and the film upon which the image is formed.

In the accompanying drawing:

Figs. 1 and 2 are axial sections of two objectives each composed of two elements.

Figs. 3 and 4 show two objectives having each three elements.

Similar numerals refer to similar parts throughout the several views and the propagation of light takes place in the direction of the arrows as indicated in each of the four figures. In the corresponding tables, R, $R_1$ . . . indicate the radius of curvature, $d$, the thickness of each lens, L the interval between two lenses.

The embodiment illustrated in Fig. 1 corresponds to the following characteristics:

Focal distance: f=100 m/m. Relative aperture: f:0,85.

| | Radii | Thickness | Indices for the G line |
|---|---|---|---|
| a | $R_1$=+98 m/m<br>$R_2$=+758,8 | d=40 m/m<br>L=0,4 | n=1,649 |
| b | $R_3$=+50,44<br>$R_4$=−120,0 | d=48,0 | n=1,520 |
| c | $R_5$=+39,6 | d=24,0 | n=1,775 |

In this objective the first element consists of a lens $a$ having a focal distance of 170 m/m. The second element comprises two lenses cemented together: converging lens $b$ and lens $c$. The whole of these lenses constitutes a converging system and its thickness is equal to approximately 10% of the focal distance of the objective.

In order to correct the zone defects, the front lens $b$ is surrounded by concentric rings $h$, $i$ having the same refractive index and an aspherical front surface, the curvature of which grows proportionally to the distance from the optical axis.

The embodiment illustrated in Fig. 2 corresponds to the following characteristics:

Focal distance: f=100 m/m. Relative opening: f:0,60.

| | Radii | Thickness | Indices for the G line |
|---|---|---|---|
| $a'$ | $R_1=+108,1$ m/m | $d=21$ m/m | $n=1,660$ |
|  | $R_2=+223,6$ | $L=0,0$ |  |
| $a''$ | $R_3=+72,8$ | $d=21$ | $n=1,660$ |
|  | $R_4=+108,1$ | $L=0,0$ |  |
| $b\ m\ p$ | $R_5=+55,1$ | $d=44$ | $n=1,520$ |
|  | $R_6=-289,2$ | $d=3$ | $n=1,775$ |
| $c$ | $R_7=+61,6$ |  |  |

In this embodiment the first element is made of two meniscus lenses $a'$ and $a''$, the total focal distance of this combination being of approximately 140 m/m.

The thickness of the second element is approximately one half of the total length of the objective.

Rearwardly of the front lens $b$ of the second element there are additional lenses $m$, $p$ extending laterally beyond lens $b$ and having aspherical front surfaces the curvature of which grows with the distance to the optical axis. These additional lenses $m$ and $p$ have the same refractive index as $b$ so that the rays of the intermediate pasted surfaces may be of any nature whatever.

The whole of the system $b$, $m$, $p$, $c$ is converging.

The embodiment illustrated in Fig. 3 comprises three elements and has the following characteristics:

Focal distance: f:100 m/m. Relative opening: f:0, 57.

| | Radii | Thickness | Indices for the G line |
|---|---|---|---|
| $a$ | $R_1=+125,8$ m/m | $d=33,7$ m/m | $n=1,755$ |
|  | $R_2=+840,4$ | $L=0,1$ |  |
| $b\ m\ p\ q$ | $R_3=+69,5$ | $d=54,5$ | $n=1,511$ |
|  | $R_4=-210,1$ | $d=21,0$ | $n=1,755$ |
| $c$ | $R_5=+33,8$ | $L=33,4$ |  |
| $s$ | $R_6=+25,3$ | $d=34,4$ | $n=1,755$ |
|  | $R_7=+52,5$ |  |  |

The first element is formed by a meniscus lens curved in toward the image.

The second element comprises, rearwardly of a central lens $b$, segments of lenses $m$, $p$, $q$, of same index as $b$ and the edges of which extend beyond said lens. The front surfaces of these edges are aspherical and their curvatures, similarly as in the example shown in Fig. 2, increase towards the exterior.

The radius of curvature of the front edge of segment $m$ ranges from 69,5 to 68,7, that of segment $p$ from 68,7 to 67,4, and that of segment $q$ from 67,4 to 65,8.

A diverging lens $c$ is adapted rearwardly of lens $q$. The second element is diverging and its thickness is approximately 15% of the focal distance.

The third element comprises a converging lens $s$ having a focal distance lower than that of the first element.

The embodiment shown in Fig. 4 corresponds to the following characteristics:

Focal distance: 100 m/m. Relative opening: f:0,54.

| | Radii | Thickness | Indices for the G line |
|---|---|---|---|
| $a'$ | $R_1=+136,1$ m/m | $d=27,3$ m/m | $n=1,6348$ |
|  | $R_2=+403,1$ | $L=0,1$ |  |
| $a''$ | $R_3=+92,5$ | $d=27,1$ | $n=1,6348$ |
|  | $R_4=+152,5$ | $L=0,1$ |  |
| $b\ m\ p\ q$ | $R_5=+53,1$ | $d=56,6$ | $n=1,5123$ |
|  | $R_6=-474,4$ | $d=2,7$ | $n=1,7414$ |
| $c$ | $R_7=+19,7$ | $L=7,3$ |  |
| $s$ | $R_8=+24,2$ | $d=38,5$ | $n=1,5348$ |
|  | $R_9=\infty$ |  |  |

In this arrangement the first element comprises two meniscus lenses $a'$, $a''$, similar to those described in the embodiment shown in Fig. 2.

The second element is analogous to that shown in Fig. 3.

The rear face of the third element $s$ is plane and the image is formed at a very slight distance rearwardly of this face.

In an objective of this type the cinematographic film $t$ upon which the image is formed, slides along the plane surface rearwardly of the third element and the same is preferably impregnated with Vaseline oil or with any other suitable liquid.

I claim:

1. A photographic objective which comprises, in combination, a first converging lens adapted to receive the incident light, and a second lens element located close behind the first mentioned one and in line therewith, said second lens element being of a total thickness equal to from 40 to 80% of the focal length of the whole objective and including a front converging lens and a rear diverging lens assembled together, the rear lens having a refractive index greater than that of the front lens by from 0.15 to 0.25, the front surface of said front converging lens including a spherical central portion and an aspherical peripheral portion the curvature of which increases gradually from its inner part to its outer part.

2. A photographic objective which comprises, in combination, a first converging lens adapted to receive the incident light, and a second lens element located close behind the first mentioned one and in line therewith, said second lens element being of a total thickness equal to from forty to eighty per cent of the focal length of the whole objective and including a front converging lens and a rear diverging lens assembled behind each other, said rear diverging lens having a refractive index greater than that of said front converging lens by from 0.15 to 0.25, the front surface of said front converging lens including a spherical central portion and an aspherical peripheral portion the curvature of which increases gradually from its inner part to its outer part, and a third lens element located immediately behind the second lens element, of a focal length shorter than that of the first mentioned lens element.

3. A photographic objective which comprises, in combination, a first converging lens adapted to receive the incident light, a second composite lens element located close behind the first mentioned one and in line therewith, said second lens element being of a total thickness equal to from forty to eighty per cent of the focal length of the whole objective and including a front converging lens of spherical front surface and a plurality of concentric annular refracting elements surrounding said front converging lens, and a rear diverging lens located behind said front converging lens and said annular elements and adjoining them, said rear diverging lens having a refractive index greater than that of the front converging lens by from 0.15 to 0.25, said annular elements being of a curvature which increases gradually from the annular element of smaller diameter to the outer annular element.

4. A photographic objective which comprises, in combination, a first converging lens adapted to receive the incident light, and a second composite lens element located close behind the first mentioned one and in line therewith, said second lens element being of a total thickness equal to from forty to eighty per cent of the focal length of the whole objective and including a front converging lens of spherical front surface and a plurality of intermediate lenses all of the same refractive index located behind said last mentioned converging lens in adjoining relation, having their edges projecting concentrically around said last mentioned converging lens so as to prolong the front surface thereof, said edges forming together an aspherical peripheral surface of a curvature which increases from the inner periphery thereof to the outer periphery, and a rear diverging lens located behind said intermediate lenses, said rear diverging lens being of a refractive index greater than that of the front converging lens by from 0.15 to 0.25.

5. A photographic objective according to claim 4, further including a third lens element located immediately behind the second composite lens element and in line therewith, said third lens element being of a focal length shorter than that of the first mentioned lens.

6. A photographic objective according to claim 2, in which said third lens element has a plane rear face, further including a layer of liquid applied upon said rear face, so as to be interposed between said face and the photographic surface on which the image is to be formed by the objective.

GEORGES FÉLIX DJIAN.